April 6, 1965  R. S. WOOD  3,176,701
FLYWEIGHT-OPERATED GOVERNOR VALVES
Filed Oct. 20, 1961

United States Patent Office 3,176,701
Patented Apr. 6, 1965

3,176,701
FLYWEIGHT-OPERATED GOVERNOR VALVES
Robert Spurgeon Wood, Chadwell Heath, Romford, England, assignor to The Plessey Company Limited, Ilford, England, a British company
Filed Oct. 20, 1961, Ser. No. 146,659
Claims priority, application Great Britain, Oct. 25, 1960, 36,576/60
4 Claims. (Cl. 137—56)

This invention relates to fly-weight operated governors of the kind in which a piston-type fluid-control slide valve is operated directly by fly weights and is, in order to reduce friction resistance to longitudinal displacement of the slide valve under the action of the fly weights, caused to rotate relative to the sleeve in which it works.

The invention has for an object to provide an improved governor of the kind specified in which rotation is imparted to the slide valve by the fly-weights in such manner as to minimise the amount of extra friction thereby introduced which might oppose the governor effect.

According to the present invention the fly-weights are pivoted about axes which extend at right angles to the axis of rotation of the governor and are arranged to transmit the pivotal motion of the flyweights in a linear fashion to the slide valve, the latter being arranged coaxially with the governor, while rotation is transmitted from the fly-weights to the slide valve by smooth cylinder surfaces provided on the flyweights and having axes which coincide with the pivot axes of the governor flyweights, these surfaces being arranged to co-operate with surfaces on the slide valve which extend parallel to the joint axis of the governor and slide valve, the radius of the said cylinder surfaces being such that the surfaces will roll without sliding on their co-operating flat surfaces when the slide valve is moved axially by the angular motion of the fly-weights, the flat surfaces being offset in the direction of the pivot axis from the plane containing the governor axis and perpendicular to the said pivot axis.

Preferably the transmission of the pivotal movement of the fly-weights to the slide valve is effected by means of gear segments fixed to the governor fly-weights which co-operate with rack elements on the slide valve element and have a pitch radius equal to the radius of the cylinder surfaces associated with the same fly-weights.

The drawing accompanying the specification illustrates one embodiment of the invention in which a cylinder portion carrying the cylinder surface and a gear sector are arranged symmetrically at opposite sides of the central plane of each fly-weight.

Figure 1:
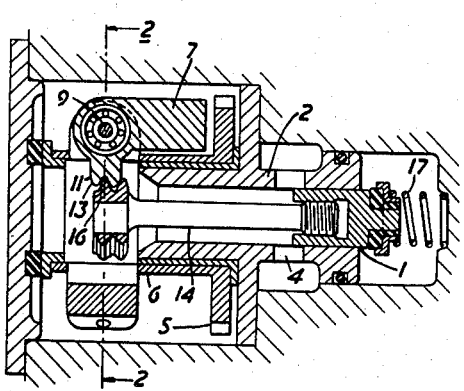
FIGURE 1 is a side elevation of the governor in section on line 1—1 of FIGURE 2.

Referring now to the drawing, a hydraulic slide-valve piston 1 is slidable in a stationary sleeve 2 to control the flow of hydraulic fluid through ports 4 provided in the sleeve. Rotatable about the sleeve 2 by means of a gear 5 is a hollow governor shaft 6, on which three fly-weights 7 are mounted in ball bearings 8 for movement about pivots 9. Each fly-weight 7 is provided with a pair of lugs 10 and 11 spaced equally at opposite sides from the centre plane of the fly-weight. The lug 10 terminates in a smooth cylinder surface 12 while the lug 11 terminates in a gear sector 13 having a pitch circle of a radius equal to that of the cylinder surface 12. The slide valve 1, which is preferably spring-loaded by a helical spring 17 for movement towards a position of rest, has an extension rod 14 terminating in an end flange 15. This flange is formed with axially extending racks 16 co-operating with the gear sectors 13 and with flat guide surfaces 18 which co-operate with the cylinder surfaces 12 of the fly-weights 7. When the governor is rotated by means of the gear 5, centrifugal forces will act upon the fly-weights 7 to rock the latter outwardly about the pivot 9, and as a result the slide-valve piston 1 with its rod 14 will be moved axially against the action of the spring 17 by the co-operation of the gear sectors 13 with the rack sections 16.

Figure 2:
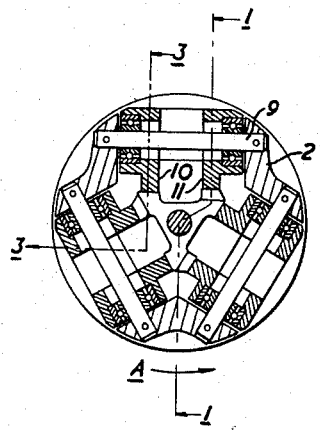
FIGURE 2 is a cross-section on line 2—2 of FIGURE 1.
Figure 3:
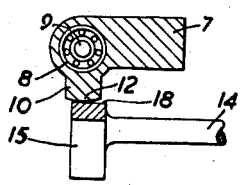
FIGURE 3 is a part-section on line 3—3 of FIGURE 1.

Assuming now that the governor is rotated in the direction indicated by arrow A in FIGURE 2, the torque required to rotate the piston valve 1 in the sleeve 2 will be transmitted to the former by contact pressure of the cylinder surfaces 12 on the flat surfaces 18 of the flange 15; due to the nature of a cylinder surface, such forces will always be radial to the pivot axis of each weight 7, and due to the equality of the radius of each of the cylinder surfaces 12 with the radius of the pitch circle of each of the gear sectors 13, the transmission of the torque required for overcoming the rotational friction of the slide valve in its sleeve will not interfere in any way with the governor action of the fly-weights 7. Furthermore, since the torque required for producing rotation of the slide valve will always be opposed to the direction of rotation of the governor shaft, the transmission of this torque will not in any normally occurring circumstances affect the desired spacing between the rack element 16 and the axis of the gear element 11, which is ensured by the contact between the cylinder surface 12 and the linear surfaces 18. Moreover, due to the provision of three fly-weights, the flange 15 will be automatically centred by the co-operation of the cylinder surfaces 12 and linear surfaces 18.

The details of the apparatus described may be modified without exceeding the scope of the present invention. Thus if desired the gear sectors 13 may be arranged centrally on the fly-weights 7 on a third lug similar to the lugs 10 and 11 while the two lugs 10 and 11 may in this case be both provided with cylinder surfaces co-operating with flat surfaces on the head 15.

What I claim is:

1. A centrifugal governor comprising in combination a stationary governor sleeve having along its axis a cylindrical bore provided with a control port, a slide valve element mounted for longitudinal sliding movement in said cylindrical bore and rotatable therein about the axis thereof, said slide valve element having a circumferentially extending control edge for co-operation with said port and having a stem fixedly connected to it and projecting longitudinally of said sleeve beyond one end of said sleeve, said stem having a head at its projecting end, a governor bush mounted for coaxial rotation about the sleeve and having means engageable to drive the bush for rotation about its axis, a set of governor weights pivoted on said bush for movement about fulcrum axes each disposed at right angles to a plane that includes the axis of the bush, each governor weight having an arm extending from its fulcrum axis at an angle to the radius that contains the centre of gravity of the weight, and having a cylinder surface coaxial with the fulcrum axis of the weight and spaced laterally from the said plane, said head having plane surfaces parallel to the axis of the bush and respectively in tangential contact with each such cylinder surface, the combination also comprising coupling means arranged outside said cylinder surfaces, coupling each arm to said head for transmitting thereto longitudinal movement in accordance with the centrifugal movement of the weights about their fulcra.

2. A centrifugal governor as claimed in claim 1, wherein said coupling means are constituted by a gear segment on each arm, and rack means on said head co-operating with said gear segments, the gear segment of each weight having a pitch circle equal in radius to the cylinder of the same weight and being axially spaced from said cylinder surface.

3. A centrifugal governor as claimed in claim 2, wherein each governor weight has one cylinder surface and one gear segment, said cylinder surface and segment being arranged, symmetrically to each other, at opposite sides of the plane containing the governor axis and perpendicular to the fulcrum axis of the weight.

4. A centrifugal governor as claimed in claim 1, wherein said engageable means comprise a gear wheel coaxially fixed on said bush.

References Cited by the Examiner
UNITED STATES PATENTS

| | | | |
|---|---|---|---|
| 665,552 | 1/01 | Sleigh | 137—56 X |
| 821,286 | 5/06 | Grant | 137—48 X |
| 1,720,652 | 7/29 | Hamersveld | 137—56 |
| 1,935,318 | 11/33 | Hawxhurst | 137—56 X |

ISADOR WEIL, *Primary Examiner.*

M. CARY NELSON, *Examiner.*